L. STADLER.
Seed Planter and Cultivator.
No. 83,334.                                    Patented Oct. 20, 1868.
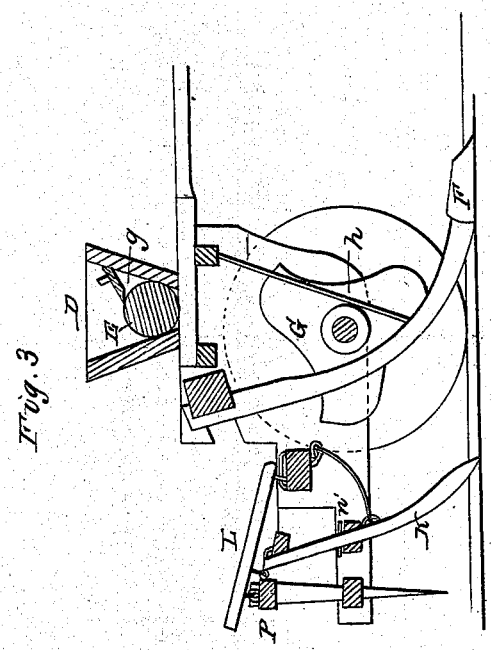
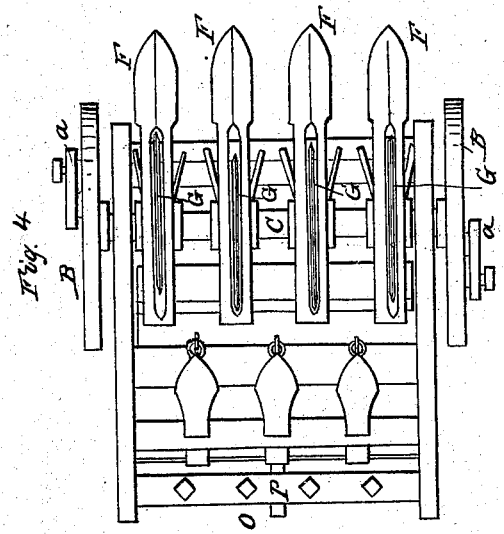
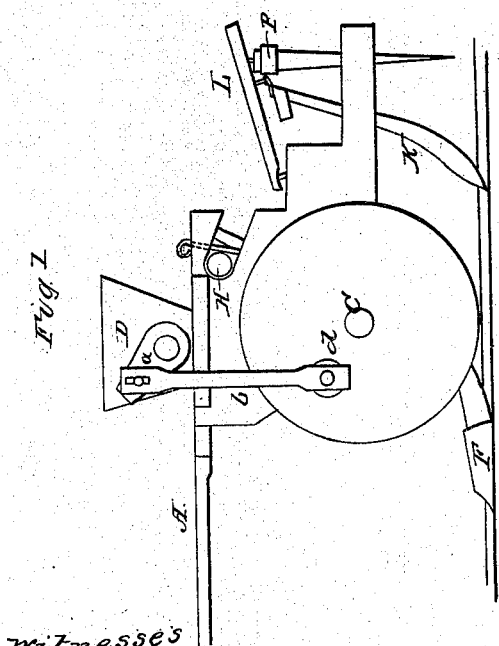
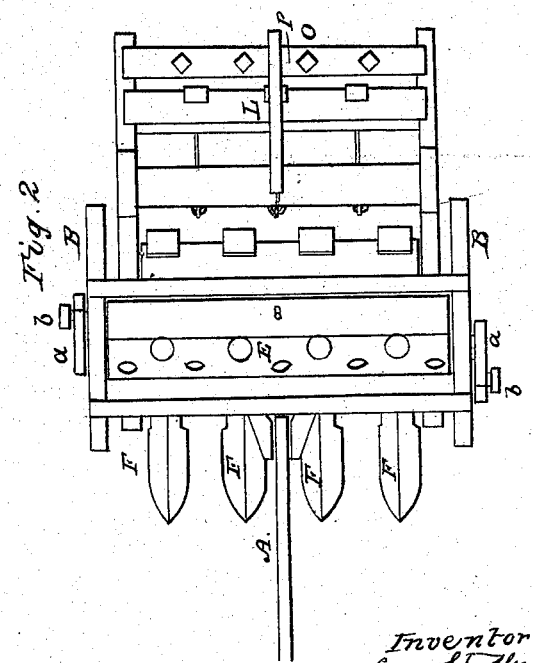
Witnesses
J. O. Smith
N. P. Chipman
Inventor
Lucas Stadler
Chipman Hosmer & Co
attys

United States Patent Office.

LUCAS STADLER, OF BOWEN, ILLINOIS.

Letters Patent No. 83,334, dated October 20, 1868.

IMPROVEMENT IN COMBINED SEEDER AND CULTIVATOR.

The Schedule referred to in these Letters Patent and making part of the same.

*To all whom it may concern:*

Be it known that I, LUCAS STADLER, of Bowen, in the county of Hancock, and State of Illinois, have invented a new and useful Machine for Cultivating and Pulverizing the Ground, cutting corn-stalks and other rubbish that may be on the surface, preparatory to sowing the seed; also, a seed-sower and harrow combined; and I do hereby declare that the following is a full, clear, and exact description of the construction and operation of the same, reference being had to the annexed drawings, making a part of this specification.

The nature of my invention consists in combining, with a cultivator, a series of sharp revolving knives, that enter the ground and cut into small fragments all corn-stalks, roots, and the like, and also in combining, with such cultivator and revolving knives, a seed-sower and harrow.

Figures 1 and 3 of the drawings are, respectively, representations of sectional views of my device;

Figure 2 is a plan view of the same from the top; and

Figure 4 is a plan view from the bottom thereof.

My carriage is in the sulky-form, as shown, of which A is the neap, B B the wheels, and C the axle. Letter D is the seed-box, in which I adjust a cylinder, E, and connect it with the carriage-wheels in such a manner as to secure a constant rotary motion, as hereinafter mentioned and described. I make a series of holes on the surface of this cylinder, about an inch in depth, more or less, to aid in the process of grain-sowing. The respective ends of this cylinder pass through the ends of the seed-box, and have bearings therein upon which they revolve. On the outside of the seed-box, and attached to the cylinder at either end thereof, are the cranks $a$ $a$. These cranks are respectively connected with the pitmen $b$ $b$. These pitmen are in turn connected with arms on the sides of the carriage-wheels, marked $d$ $d$, all adjusted in the manner shown, and unitedly serve to rotate the cylinder as the carriage moves. On the upper side of the seed-box I adjust a hinged door, as shown in fig. 3, letter $z$, which serves as a guide to the grain to the rear side of the cylinder, and for other purposes which will be readily understood.

The letters F, I denominate the sod-breakers. They are adjusted to the machine in the manner shown, and are designed to pass along under the ground, about two inches below the surface.

The letters $h$ are rods or braces extending from the front cross-bar of the carriage-frame to the sod-breakers F, and serve as a support to the same.

The letters G are a series of revolving knives constructed in the form shown, and severally adjusted firmly on the axle of the carriage. The office of these knives is to cut into small fragments all corn-stalks, roots, straw, and other like substances that may be in their path, and thereby greatly facilitate the process of cultivating and seeding the ground.

Letter H is a roller to which the upright rear ends of the sod-breakers are attached. It is held in its place by means of the pins $m$ $m$, and furnishes, in conjunction with said pins, ready means for the removal of said breakers, whenever it is desirable so to do.

The letters K are cultivator-plows, adjusted to a cross-bar of the carriage-frame, as represented, and held therein, at any desired altitude, by the pins $n$, which pins pass through holes in the upright beams thereof, and on the top of said cross-bar, as represented on the drawings.

Letters $p$ are rods extending from the cross-bar that sustains the plow-beams to a higher cross-bar placed in front thereof. These rods serve to give additional strength to the cross-bar first mentioned.

Letter L is a lever attached at its front end to the cross-bar, as shown. It is also connected with the bar that extends across the top of the plow-beams, and extends rearward sufficiently far to enable the operator to use it for the purpose of raising or lowering the plows. It is also connected with the top bar of the harrow, next mentioned, and is used in adjusting the said harrow to the desired position.

The letter O represents a harrow attached to the rear cross-bar of the carriage-frame, the teeth of which pass through said cross-bar to the ground. It consists of a series of long spikes or drag-teeth passing from a cross-bar, P, through the rear cross-bar of the carriage to the ground, in the manner represented.

What I claim as my invention, and desire to secure by Letters Patent, is—

1. The knives G, constructed and operating substantially as and for the purposes set forth.

2. Combining in one machine the knives G, the seed-sowing box D, the sod-breakers F, cultivator-plows K, and harrow O, substantially as specified.

3. A seed-sowing, cultivating, and harrowing machine, having seed-box D, cylinder E, cranks $a$ $a$, pitmen $b$ $b$, cranks $d$, sod-breakers F, knives G, roller H, pins $n$, plows K, lever S, and harrow O, constructed and arranged substantially as specified.

LUCAS STADLER.

Witnesses:
L. E. EMMONS,
M. R. BUTZ.